(12) United States Patent
Hodge

(10) Patent No.: US 12,051,295 B2
(45) Date of Patent: Jul. 30, 2024

(54) RELEASE MONITORING THROUGH CHECK-IN AND TETHERING SYSTEM

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 18/196,461

(22) Filed: May 12, 2023

(65) Prior Publication Data
US 2023/0401919 A1 Dec. 14, 2023

Related U.S. Application Data

(63) Continuation of application No. 16/736,466, filed on Jan. 7, 2020, now Pat. No. 11,651,642, which is a continuation of application No. 16/120,844, filed on Sep. 4, 2018, now Pat. No. 10,529,154, which is a
(Continued)

(51) Int. Cl.
| | |
|---|---|
| *G07C 9/28* | (2020.01) |
| *G08B 21/02* | (2006.01) |
| *G08B 21/22* | (2006.01) |
| *G08B 25/00* | (2006.01) |
| *G06V 40/10* | (2022.01) |

(52) U.S. Cl.
CPC ........... *G07C 9/28* (2020.01); *G08B 21/0227* (2013.01); *G08B 21/0261* (2013.01); *G08B 21/0269* (2013.01); *G08B 21/0272* (2013.01); *G08B 21/22* (2013.01); *G08B 25/001* (2013.01); *G06V 40/10* (2022.01)

(58) Field of Classification Search
None
See application file for complete search history.

(56) References Cited

U.S. PATENT DOCUMENTS

| | | |
|---|---|---|
| 4,495,386 A | 1/1985 | Brown et al. |
| 5,255,306 A | 10/1993 | Melton et al. |
| 5,896,556 A | 4/1999 | Moreland et al. |
| (Continued) | | |

FOREIGN PATENT DOCUMENTS

WO WO 2017/031256 A1 2/2017

OTHER PUBLICATIONS

"Criminal Calls: A Review of the Bureau of Prisons' Management of Inmate Telephone Privileges," U.S. Department of Justice, Office of the Inspector General, Aug. 1999.
(Continued)

*Primary Examiner* — John F Mortell
(74) *Attorney, Agent, or Firm* — Sterne, Kessler, Goldstein & Fox P.L.L.C.

(57) ABSTRACT

A check-in and tethering system for monitoring persons such as released in court-ordered supervised programs and a method for operating such a system is disclosed. The system includes a tethered mobile device that provides a check-in procedure that requires a response from a user of the tethered mobile device in the form of at least one of a device identifier from a monitored tethered device attached to the user, a biometric response, or a performed action by the user. The tethered mobile device determines whether the response is valid and transmits a notification to a monitoring center in response to the determination.

17 Claims, 8 Drawing Sheets

Related U.S. Application Data continuation of application No. 15/668,493, filed on Aug. 3, 2017, now Pat. No. 10,068,398.

(56) References Cited

U.S. PATENT DOCUMENTS

| | | | |
|---|---|---|---|
| 6,054,928 | A | 4/2000 | Lemelson et al. |
| 6,058,173 | A | 5/2000 | Penfield et al. |
| 6,463,127 | B1 | 10/2002 | Maier et al. |
| 6,668,045 | B1 | 12/2003 | Mow |
| 6,965,590 | B1 | 11/2005 | Schmidl et al. |
| 7,085,359 | B2 | 8/2006 | Crites et al. |
| 7,106,843 | B1 | 9/2006 | Gainsboro et al. |
| 7,218,993 | B2 | 5/2007 | Yasukawa et al. |
| 7,254,708 | B2 | 8/2007 | Silvester |
| 7,280,816 | B2 | 10/2007 | Fratti et al. |
| 7,333,798 | B2 | 2/2008 | Hodge |
| 7,366,782 | B2 | 4/2008 | Chong et al. |
| 7,529,357 | B1 | 5/2009 | Rae et al. |
| 7,587,067 | B1 | 9/2009 | Schiller |
| 7,742,581 | B2 | 6/2010 | Hodge et al. |
| 7,804,941 | B2 | 9/2010 | Keiser et al. |
| 7,860,222 | B1 | 12/2010 | Sidler et al. |
| 7,899,167 | B1 | 3/2011 | Rae |
| 8,019,354 | B2 | 9/2011 | Rae et al. |
| 8,031,052 | B2 | 10/2011 | Polozola |
| 8,370,206 | B2 | 2/2013 | Collins |
| 8,428,559 | B2 | 4/2013 | Silva |
| 8,498,937 | B1 | 7/2013 | Shipman, Jr. et al. |
| 8,571,525 | B2 | 10/2013 | Weinstein et al. |
| 8,639,926 | B2 | 1/2014 | Brown et al. |
| 8,646,056 | B2 | 2/2014 | Poplett |
| 8,917,848 | B2 | 12/2014 | Torgersrud et al. |
| 9,094,500 | B1 | 7/2015 | Edwards |
| 9,124,763 | B2 | 9/2015 | Humphries |
| 9,232,051 | B2 | 1/2016 | Torgersrud et al. |
| 9,262,604 | B2 | 2/2016 | Kimbrell |
| 9,307,386 | B2 | 4/2016 | Hodge et al. |
| 9,614,954 | B2 | 4/2017 | Hodge et al. |
| 9,614,955 | B2 | 4/2017 | Hodge et al. |
| 9,661,128 | B2 | 5/2017 | Hodge et al. |
| 9,674,338 | B2 | 6/2017 | Hodge et al. |
| 10,068,398 | B1 | 9/2018 | Hodge |
| 10,529,154 | B2 | 1/2020 | Hodge |
| 2002/0071537 | A1 | 6/2002 | Gainsboro |
| 2003/0036381 | A1 | 2/2003 | Nagashima |
| 2003/0086546 | A1 | 5/2003 | Falcone et al. |
| 2003/0126470 | A1 | 7/2003 | Crites et al. |
| 2003/0198325 | A1 | 10/2003 | Bayne |
| 2003/0224764 | A1 | 12/2003 | Baker |
| 2005/0265529 | A1 | 12/2005 | Hogg, Jr. et al. |
| 2006/0062355 | A1 | 3/2006 | Leonard |
| 2006/0176169 | A1 | 8/2006 | Doolin et al. |
| 2007/0041545 | A1 | 2/2007 | Gainsboro |
| 2007/0047694 | A1 | 3/2007 | Bouchard et al. |
| 2007/0057763 | A1 | 3/2007 | Blattner et al. |
| 2008/0057976 | A1 | 3/2008 | Rae et al. |
| 2008/0200156 | A1 | 8/2008 | Hicks et al. |
| 2009/0080629 | A1 | 3/2009 | Rokosky et al. |
| 2010/0062833 | A1 | 3/2010 | Mattice et al. |
| 2010/0189228 | A1 | 7/2010 | Seyfetdinov |
| 2010/0260173 | A1 | 10/2010 | Johnson |
| 2011/0158223 | A1 | 6/2011 | Liu et al. |
| 2011/0167440 | A1 | 7/2011 | Greenfield |
| 2011/0213618 | A1 | 9/2011 | Hodge et al. |
| 2011/0237226 | A1 | 9/2011 | Dhuna |
| 2012/0099714 | A1 | 4/2012 | Hodge |
| 2012/0252411 | A1 | 10/2012 | Johnsgard et al. |
| 2012/0262271 | A1 | 10/2012 | Torgersrud et al. |
| 2013/0179210 | A1 | 7/2013 | Collins |
| 2013/0311364 | A1 | 11/2013 | Shipman et al. |
| 2014/0032691 | A1 | 1/2014 | Barton et al. |
| 2014/0044242 | A1 | 2/2014 | Hodge et al. |
| 2014/0089849 | A1 | 3/2014 | Choi et al. |
| 2014/0109174 | A1 | 4/2014 | Barton et al. |
| 2014/0219432 | A1 | 8/2014 | Bengston et al. |
| 2014/0267547 | A1 | 9/2014 | Torgersrud et al. |
| 2014/0273929 | A1 | 9/2014 | Torgersrud |
| 2014/0282868 | A1 | 9/2014 | Sheller et al. |
| 2014/0287715 | A1 | 9/2014 | Hodge et al. |
| 2015/0039672 | A1 | 2/2015 | Hussain et al. |
| 2015/0242629 | A1 | 8/2015 | Lindo et al. |
| 2015/0271777 | A1 | 9/2015 | Torgersrud et al. |
| 2016/0055323 | A1 | 2/2016 | Stuntebeck et al. |
| 2016/0066182 | A1 | 3/2016 | Hodge et al. |
| 2016/0088021 | A1 | 3/2016 | Jayanti Venkata et al. |
| 2016/0219146 | A1 | 7/2016 | Hodge et al. |
| 2016/0267257 | A1 | 9/2016 | Wisgo |
| 2016/0309122 | A1* | 10/2016 | Kingery ................ H04N 7/181 |
| 2016/0330084 | A1 | 11/2016 | Hunter et al. |
| 2016/0381212 | A1 | 12/2016 | Hodge et al. |
| 2016/0381219 | A1 | 12/2016 | Hodge et al. |
| 2016/0381556 | A1 | 12/2016 | Hodge et al. |
| 2017/0061006 | A1 | 3/2017 | Hildebrand et al. |
| 2017/0084150 | A1 | 3/2017 | Keyton |
| 2017/0148241 | A1 | 5/2017 | Kerning et al. |
| 2017/0177892 | A1 | 6/2017 | Tingstrom et al. |
| 2017/0193622 | A1 | 7/2017 | Rosado |
| 2017/0208468 | A1 | 7/2017 | Hodge et al. |
| 2019/0371151 | A1 | 12/2019 | Piantedosi |
| 2020/0219349 | A1 | 7/2020 | Hodge |

OTHER PUBLICATIONS

European Search Report and Opinion directed to European Patent Application No. 14769931.8, dated Oct. 26, 2016; 10 pages.

File History of U.S. Pat. No. 9,094,500, U.S. Appl. No. 14/322,869, filed Jul. 2, 2014.

File History of U.S. Pat. No. 9,307,386, U.S. Appl. No. 13/946,637, filed Jul. 19, 2013.

International Search Report and Written Opinion of the International Searching Authority, directed to International Patent Application No. PCT/US14/31339, mailed Nov. 6, 2014; 19 pages.

Knox, "The Problem of Gangs and Security Threat Groups (STG's) in American Prisons Today: Recent Research Findings From the 2004 Prison Gang Survey," National Gang Crime Research Center, 2005; 67 pages.

Rey, R.F., ed., "Engineering and Operations in the Bell System," 2nd Edition, AT&T Bell Laboratories: Murray Hill, NJ, 1983.

Rosenberg, et al., "SIP: Session Initial Protocol," Network Working Group, Standard Track, Jun. 2002; 269 pages.

U.S. Appl. No. 61/801,861, "Handheld Video Visitation," to Torgersrud, et al., filed Mar. 15, 2013.

Winterdyk et al., "Managing Prison Gangs," Journal of Criminal Justice, vol. 38, 2010; pp. 730-736.

U.S. Appl. No. 61/804,479, filed Mar. 22, 2013.

International Search Report and Written Opinion of the International Searching Authority directed to related International Patent Application No. PCT/US2018/045199, mailed Sep. 7, 2018; 6 pages.

* cited by examiner

RELEASE MONITORING THROUGH CHECK-IN AND TETHERING SYSTEM

RELATED APPLICATIONS

This application is a continuation of U.S. Nonprovisional patent application Ser. No. 16/736,466, filed Jan. 7, 2020, issued as U.S. Pat. No. 11,651,642 on May 16, 2023, which is a continuation of U.S. Nonprovisional patent application Ser. No. 16/120,844, filed on Sep. 4, 2018, issued as U.S. Pat. No. 10,529,154, which is a continuation of U.S. Nonprovisional patent application Ser. No. 15/668,493, filed on Aug. 3, 2017, issued as U.S. Pat. No. 10,068,398, both titled "Release Monitoring Through Check-In and Tethering System," and the contents of which are hereby incorporated herein by reference in their entireties.

BACKGROUND

Field

This disclosure relates to monitoring persons such as those released on court-ordered supervised programs using a check-in and tethering system.

Background

In certain situations, persons that are released from custody are required to be electronically monitored outside of a controlled environment. To monitor the released persons, jurisdictions typically are limited to options having issues that are expensive, inflexible, and inconvenient. One option is a home-based device which is a device permanently placed in a residence of the monitored person and which communicates with a device that is attached to the monitored person. Because it relies on a home-based device, this implementation confines the monitored person to their residence and any sort of travel away from the residence, such as visits to the doctor or probation officer, could cause an alarm. Accordingly, this implementation does not accommodate the monitored person leaving his residence such as for work release or community service work. Another option relies on global positioning system (GPS) where the device attached to the monitored person is a GPS communications device that transmits the location of the offender by cellular transmission to the jurisdiction for position monitoring. However, GPS communications devices are bulky, expensive as they require a cellular connection, and require more frequent charges of their battery.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
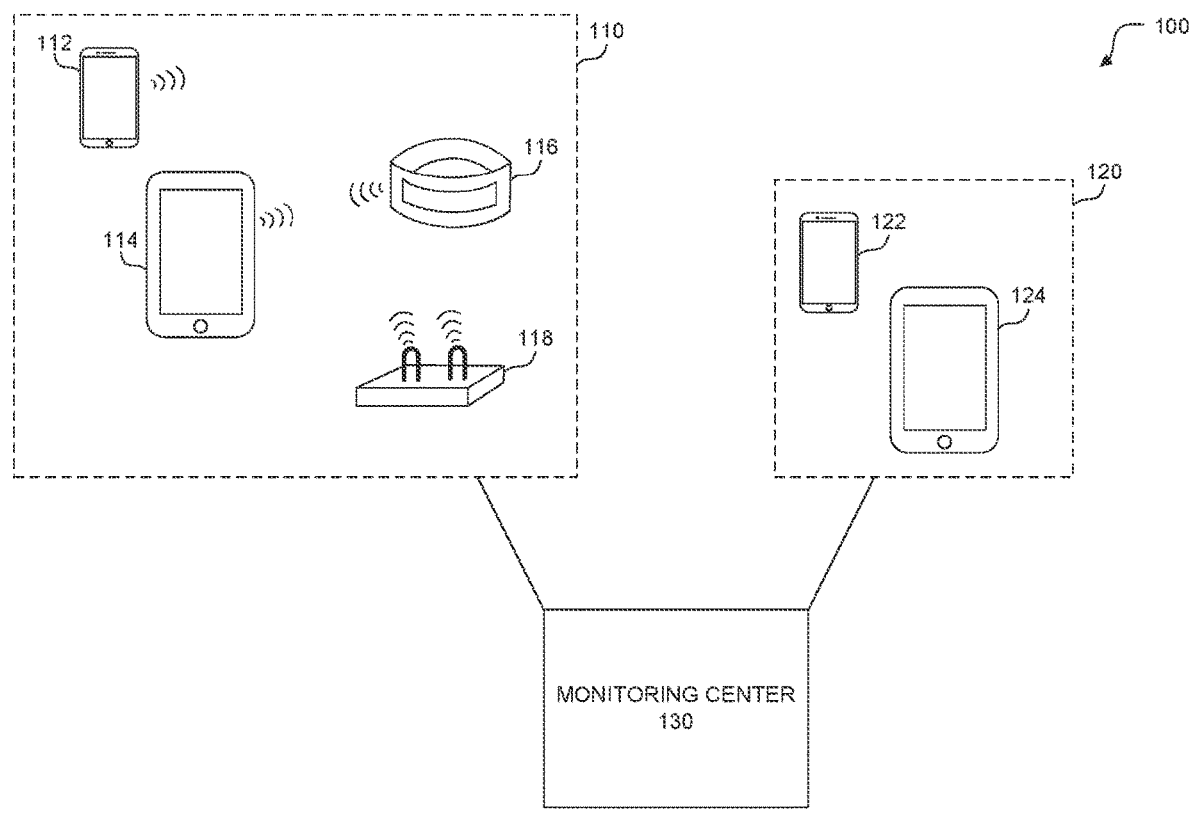
FIG. 1 illustrates a block diagram of an exemplary tethering monitoring system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Tethering Monitoring System

FIG. 1 illustrates a block diagram of an exemplary tethering monitoring system 80, according to embodiments of the present disclosure. Tethering monitoring system 100 includes a tethering system 110, a tethering system 120, and a monitoring center 130. In some embodiments, tethering system 110 and tethering system 120 represent tethered devices that are required to be within a proximity of a user who is to be monitored by monitoring center 130. Tethering system 110 includes a tethered monitoring device 116, a router 118, and at least one tethered mobile device 112 and tethered mobile device 114. In some embodiments, tethered monitoring device 116 is a device such as a wristband or ankle band that is physically attached to a user to be monitored. In some embodiments, tethered mobile device 112 is a smartphone and tethered mobile device 114 is a tablet.

In some embodiments, tethered monitoring device 116 wirelessly communicates with router 118 and/or tethered mobile devices 112 and 114 using a wireless communication standard. Examples of wireless communication standards that may be employed in this disclosure include but are not limited to IEEE 802.11 (otherwise known as "Wi-Fi"), Bluetooth, Bluetooth Low Energy ("BTLE"), or near field communication such as radio frequency identification ("RFID"). For ease and simplicity, the embodiment will be further discussed with regard to tethered mobile device 112. However, it is to be understood that such discussion also applies to tethered mobile devices 114, 122, or 124.

In some embodiments, tethered mobile device 112 initiates a check-in procedure whereby a user associated with tethered mobile device 112 and tethered monitoring device 116 responds to requests from tethered mobile device 112. In some embodiments, the check-in procedure is initiated by a check-in application downloaded and installed on tethered mobile device 112. The check-in application is provided by a jurisdiction or authority, such as monitoring center 130, responsible for monitoring the user of tethered mobile device 112. Because the check-in application assists in monitoring the user, the check-in application is installed and configured in such a manner to prevent the user of tethered mobile device 112 from uninstalling or otherwise modifying the check-in application. In some embodiments, installation of the check-in application results in the creation of a secure area, such as a private container, in a file system of tethered mobile device 112. The secure area, and therefore, any files such as the check-in application stored therein, can only be accessed by authorized officials such as administrators of monitoring center 130. In some embodiments, the secure area is controlled entirely by monitoring center 130.

The check-in application of tethered mobile device 112 initiates the check-in procedure based on any number of check-in conditions including but not limited to a remote instruction from monitoring center 130, a scheduled check-in request, a random check-in request, or a monitored condition of the tethered mobile device 112 (e.g., stationary for a predetermined period of time). The purpose of the check-in procedure is allow monitoring center 130 to verify that the user of tethered mobile device 112 is using or within a certain proximity of tethered mobile device, to prevent the user from attempting to circumvent monitoring by monitoring center 130 (e.g., to flee the jurisdiction, to make unauthorized trips), and to confirm that the user is behaving consistent with the conditions of his release from custody.

In some embodiments, the check-in procedure includes automated (e.g., without requiring action from the user) and manual (e.g., requiring action from the user) check-ins to the check-in application of tethered mobile device 112. An automated check-in includes a check-in request transmitted from tethered mobile device 112 to tethered monitoring device 116. In some embodiments, the check-in request is a request for tethered monitoring device 116 to provide a response that allows tethered mobile device 112 to verify that tethered monitoring device 116 is within a certain proximity and that it is still operating properly. With regards to proximity, if tethered mobile device 112 and tethered monitoring device 116 communicate using near field communications, then tethered monitoring device 116 is ideally within a predetermined range of tethered mobile device 112 in order to receive the check-in request. This predetermined range is generally determined by the specific protocol used such as Bluetooth, BTLE, or RFID. If tethered mobile device 112 and tethered monitoring device 116 communicate using Wi-Fi (e.g., through router 118), then tethered mobile device 112 is also ideally within a predetermined range of tethered mobile device although for Wi-Fi this range is generally larger than the range for near field communications. Regardless of the protocol, if tethered monitoring device 116 is not within the predetermined range, the check-in application can perform any number of actions as defined from monitoring center 130. The check-in application may initiate a follow-up check-in request over the same communication protocol as the first check-in request, a follow-up check-in request over a communication protocol different from the protocol used to send the first check-in request, and/or performs a follow-up action such as transmitting an alert notification to monitoring center 130 indicating that tethered monitoring device 116 has not responded to the check-in request.

In some embodiments, a response to the check-in request includes a device identifier that uniquely identifies tethered monitoring device 116. The check-in application verifies that the device identifier received in the response is the same as the device identifier that is pre-programmed into the check-in application and also stored in the secure area, such as a private container, of tethered mobile device 112. Monitoring center 130 configures tethered mobile device 112 to store the device identifier that is expected to be communicating with the check-in application in the secure area that cannot be accessed by the user. Accordingly, the user of tethered monitoring device 116 cannot access or otherwise see the device identifier. In some embodiments, the check-in request also includes other information about operations of the tethered monitoring device 116 such as but not limited to battery level and activity level (e.g., whether the tethered monitoring device 116 has been stationary for a predetermined period of time).

In some embodiments, a manual check-in includes a real-time verification request that generally requires some action to be performed by a user. The performance of the action and/or the results of the action are used by the check-in application and monitoring center 130 to determine whether the user is within proximity of or otherwise operating tethered mobile device 112. In some embodiments, a real-time verification request is an identity check to verify the identity of the user of tethered mobile device 114. Examples of real-time verification requests include challenges to the user such as biometric checks or actions to be performed by the user. Biometric checks include requiring the user to take a picture of his face using a camera of tethered mobile device 112, place his thumb on a display of tethered mobile device 112, and/or speak a random phrase displayed on tethered mobile device 112. In some embodiments, biometric checks are initiated by the check-in application on tethered mobile device. Biometric checks include performing facial recognition on an image from a camera of tethered mobile device, fingerprint recognition of an fingerprint that is received by the check-in application through either the display of tethered mobile device 112 or a dedicated fingerprint reader of tethered mobile device, or voice recognition of the user's voice received through a microphone of tethered mobile device 112. In some embodiments, there is a predetermined response period for the user to response to the identity check. If the user does not respond within the predetermined response period, an alert message or notification is transmitted to monitoring center 130.

Accordingly, the check-in application includes a camera function, a fingerprint reader function, and a voice recorder function, which in some embodiments, is represented as a graphical user interface that are displayed on tethered mobile device 112. The camera function controls tethered mobile device 112 to take a picture using any of the cameras on tethered mobile device 112. The fingerprint reader function controls tethered mobile device 112 to display a graphical user interface in which the user can place his finger. The voice recorder function controls a microphone and display of tethered mobile device 112. The display is controlled to display a predetermined phrase that is to be repeated by the user using the microphone of tethered mobile device 112. The predetermined phrase is randomly selected from stored phrases in the secure area of tethered mobile device 112 or provided remotely by monitoring center 130. In some embodiments, the check-in application randomly selects which biometric check to perform or can be remotely selected by monitoring center 130. The purpose of the phrase is to prevent the user from anticipating (and pre-recording his voice) the phrase so that another user could attempt to respond to the biometric check using a prerecorded message.

In some embodiments, actions to be performed by the user include answering questions (e.g., such as "What is 49+30?") or specific operations to be performed using tethered mobile device 112. Examples of operations include but are not limited to using the camera of tethered mobile device 112 to take a picture of tethered monitoring device 116 or any other predetermined object within the user's home such as a clock or a television, sending a text or email message to a predetermined address associated with monitoring center 130, or calling a predetermined phone number associated with monitoring center 130 and providing a voice sample for verification.

In some embodiments, the check-in application is able to initiate the real-time verification request and the functions described above absent any input or instruction from the user of tethered mobile device 112. In some embodiments, the real-time verification request is initiated automatically by the check-in application in response to a check-in condition or initiated remotely by monitoring center 130. Accordingly, the check-in application, and by extension, monitoring center 130 have control over operations of tethered mobile device 112 including its camera, display, and microphones without requiring the user's authorization or instructions. A verification response is received in response to the verification request and it is determined whether the verification response is a valid or invalid verification response.

In some embodiments, the check-in application sends periodic messages to monitoring center 130 to ensure that tethered mobile device 112 is still operational. A user may attempt to circumvent monitoring by turning off or otherwise disabling his device. If monitoring center 130 fails to receive a periodic message from tethered mobile device 112, monitoring center 130 can initiate the appropriate protocols for tracking and otherwise locating the user.

In some embodiments, the check-in application locks all operations of tethered mobile device 112 until an appropriate response to a check-in is received from tethered monitoring device 116, the user, or both. For example, the check-in application is displayed as a graphical user interface on a display of tethered mobile device 112 during the check-in procedure. While displayed, the check-in application prevents the user from exiting the check-in application, from switching to another application, or even using any of the other functions of the phone such as phone calls, text messages, or using the Internet that are not authorized by the check-in application. For example, during a biometric check that involves facial recognition, the check-in application can disable all other inputs of tethered mobile device 112 except for the camera until an image of the user is received and verified. Similarly, during a biometric check that involves voice recognition, the check-in application can disable all inputs of tethered mobile device 112 except for the microphone until a voice recording of the user is received and verified. In this manner, the check-in application allows monitoring center 130 to have complete control over tethered mobile device 112 and allows monitoring center 130 to condition operations of tethered mobile device 112 on verified responses to check-in requests.

In some embodiments, the user is not required to wear tethered monitoring device 116. For example, tethering system 120 includes tethered mobile device 112 and tethered mobile device 124. In such embodiments, tethering system 120 does not implement automated check-ins but does implement manual check-ins as described above.

In some embodiments, tethered monitoring device 116 implements a back-up communication subsystem that is activated in response to determining that communications with the check-in application of tethered mobile device 112 have been interrupted or disabled. Tethered monitoring device 116 determines that it can no longer communicate with the check-in application in a variety of ways including determining that no response has been received in response to an inquiry from tethered monitoring device 116 to tethered mobile device 112 or upon not receiving a check-in request from tethered monitoring device 116 within a predetermined period of time. For example, in some embodiments, tethered monitoring device 116 includes a timer that tracks a period of time between receiving check-in requests from tethered monitoring device 116 and stores a predetermined period of time in a memory. Tethered monitoring device 116 determines that communications have been interrupted based on, for example, the timer reaching the predetermined period of time without having received a check-in request from tethered monitoring device 116.

In some embodiments, the back-up communication subsystem, by default, is deactivated to save battery usage. But upon activation (e.g., in response to an interruption in communication with the check-in application), the back-up communication subsystem allows direct communications between monitoring center 130 and tethered monitoring device 116. In some embodiments, the back-up communication subsystem communicates to monitoring center 130 over a cellular network such as a global system for mobile communication (GSM) network, a code division multiple access (CDMA) network, a 3G network, a 4G network, a 5G network or any successor cellular network. In some embodiments, the back-up communication subsystem communicates to monitoring center 130 over Wi-Fi to router 118 (if available). Yet in further embodiments, the back-up communication subsystem implements a GPS function that enables monitoring center 130 to receive location information (e.g., GPS coordinates) from tethered monitoring device 116.

In some embodiments, the connection between tethered mobile device 112 and monitoring center 130 is routed through router 118 and employs a wireless network such as Wi-Fi includes any or all of a Local-Area Network (LAN), a Wide-Area Network (WAN), or the Internet. In some embodiments, the connection between tethered mobile device 112 and monitoring center 130 is implemented through a cellular network such as a GSM network, a CDMA network, a 3G network, a 4G network, a 5G network or any successor cellular network.

In some embodiments, jurisdictions provide tethered mobile devices 112, 114, 122, and 124 for use by the user to be monitored by tethered monitoring system 100. In such embodiments, tethered mobile devices 112, 114, 122, and 124 includes the check-in application pre-installed prior to providing it to the users. In some embodiments, tethered mobile devices 112, 114, 122, and 124 are owned by the users but their release from custody or a controlled environment is conditioned upon installation of the check-in application. Whether tethered mobile device 112 is provided by monitoring center 140 or owned by user, tethered mobile device 112 operates similarly to monitor the users as described in various embodiments above and are remotely managed and updated by monitoring center 130. As previously described, in addition to allowing actions and locations of users to be monitored, the check-in application enables administrators to remotely access, configure, and otherwise control operations of tethered mobile device 112.

Exemplary Monitored Conference Device

Figure 2:
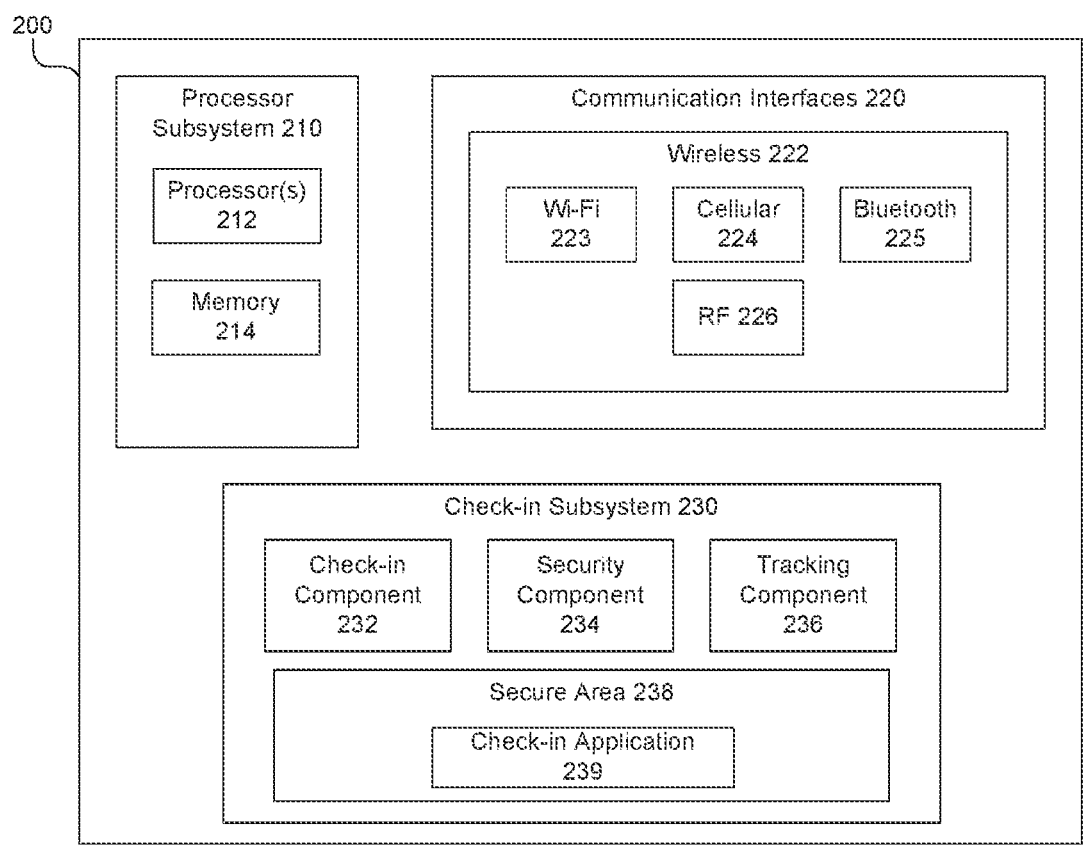
FIG. 2 illustrates a block diagram of an exemplary tethered mobile device for use in the exemplary tethering monitoring system of FIG. 1, according to embodiments of the present disclosure.

FIG. 2 illustrates a block diagram of an exemplary tethered mobile device for use in the exemplary tethering monitoring system of FIG. 1, according to embodiments of the present disclosure. Tethered mobile device 200 represents an exemplary embodiment of tethered mobile device 112 as described in FIG. 1. For ease and simplicity, the embodiment will be further discussed with regard to tethered mobile device 112. However, it is to be understood that such discussion also applies to tethered mobile devices 114, 122, or 124. In some embodiments, tethered mobile device 200 includes processor circuitry 210, communication interfaces 220, and check-in subsystem 230.

Processor circuitry 210 includes one or more processors 212 and memory 214. The number of processors 212 can be scaled to match the number of simultaneous user connections desired to be supported by a tethering monitoring system such as tethering monitoring system 100 of FIG. 1. Processors 212 control the operation of tethered mobile device 200 and its components. In some embodiments, memory 214 can be any well-known volatile and/or non-volatile memory that is removable and/or non-removable. Memory 214 can store user preferences, user profiles, and other information regarding tethered mobile device 200. User profiles can include historical information regarding actions and movement of tethered mobile device 200. For example, actions include responses received from tethered monitoring device 116 in response to check-in requests. Movement of tethered mobile device 200 includes routes travelled by tethered monitoring device 116 and/or tethered mobile device 200. In some embodiments, user profiles also contain a list of preapproved or restricted destinations and routes that the user can take. For example, the list could include approved locations such as the user's doctor's office and a supermarket. Approved or restricted routes refer to roads or paths that can be or cannot be included in a trip itinerary that is generated for the user. One reason for restricting certain roads is to prevent a user from driving by a certain location. For example, a rehabilitating drug user can be steered away from areas of a city that are known to have drug dealers.

In some embodiments, communication interfaces 220 includes one or more transceivers, transmitters, and/or receivers that communicate via a wireless interface 222, such as Wi-Fi interface 223, cellular interface 224, Bluetooth interface 225, radiofrequency (RF) interface 226. Wi-Fi interface 223 includes a Wi-Fi transceiver that enables Wi-Fi communication between tethered mobile device 200 and an external device that also has Wi-Fi capability such as router 118 or tethered monitoring device 116. Cellular interface 224 includes a cellular transceiver that enables cellular communication between tethered mobile device 200 and an external device that has cellular capability such as cellular antenna that can route communications to monitoring center 130. Bluetooth interface 225 includes a Bluetooth transceiver that enables Bluetooth communication between tethered mobile device 200 and an external device that also has Bluetooth capability, such as an access point or tethered monitoring device 116. RF interface 226 includes a RF transceiver that enables RF communication tethered mobile device 200 and an external device that has RF capability such as tethered monitoring device 116.

Check-in subsystem 230 includes components that enables the check-in and tethered functionality of tethered mobile device 200. Check-in subsystem 230 includes check-in component 232, security component 234, tracking component 236, and secure area 238. In some embodiments, check-in component 232 implements a check-in application 239 installed in secure area 238. In some embodiments, check-in application 239 is provided by monitoring center 130. In some embodiments, secure area 238 is implemented as a private container in a file system of tethered mobile device 200. A private container is a portion of the file system in tethered mobile device 200 that cannot be accessed by a user of tethered mobile device 200 but can be accessed by an administrator or monitoring center 130. In other words, the user of tethered mobile device 200 grants a third party such as monitoring center 130 remote access to tethered mobile device 200 and monitoring center 130 has control over a portion of the file system. In this manner, secure area 238 is secured from access by a user of tethered mobile device 200. Accordingly, any files or applications stored in secure area 238 cannot be modified or uninstalled unless by an authorized personnel of monitoring center 130.

Through check-in application 239, monitoring center 130 controls operations of tethered mobile device 200 by communicating with check-in component 232 such as through control messages that operates behavior of check-in application 239. Upon detecting n appropriate condition (e.g., a control message from monitoring center 130, a scheduled time), check-in application 239 initiates a check-in procedure on tethered mobile device 200. As discussed above, the check-in procedure includes submitting check-in requests to either tethered monitoring device 116 and/or for display on tethered mobile device 200. In some embodiments, the check-in requests require responses from tethered monitoring device 116 and/or the user of tethered mobile device 200.

In some embodiments, check-in component 232 ensures that tethered monitoring device 116 is still within a certain proximity to tethered mobile device 200 by responses (or the lack thereof) from tethered monitoring device 116. Check-in component 232 receives responses from tethered monitoring device 116 and is responsible for validating the responses to ensure that communications received from tethered monitoring device 116 have the appropriate identifier and/or are responsive to the check-in requests. By executing the check-in procedure, check-in component 232 monitors and tracks the presence of tethered monitoring device 116 and, indirectly, the user of tethered mobile device 200 and tethered monitoring device 116.

In some embodiments, check-in subsystem 230 manages Wi-Fi interface 223 and cellular interface 224. For example, in some embodiments, when available, check-in subsystem 230 maintains a Wi-Fi connection between Wi-Fi interface 223 and monitoring center 130. Check-in subsystem 230 uses the Wi-Fi connection to allow monitoring center 130 to maintain control over tethered mobile device 200. For example, check-in subsystem 230 can transmit and receive control messages during a check-in procedure from monitoring center 130 and is programmed to disable certain operations of tethered mobile device 200 upon detection of certain conditions such as but not limited to detecting an interruption of communications between tethered mobile device 200 and monitoring center 130 over the Wi-Fi connection, receiving a command from monitoring center 130, and detecting any attempts to compromise tethered mobile device 200. For example, check-in subsystem 230 may detect control messages from monitoring center 130 or security component 234 to disable all communications and/or operations of tethered mobile device 200 until a response to a check-in request has been received and verified. As another example, check-in component 232 periodically and/or at predetermined intervals receives control messages from monitoring center 130; check-in component 232 disables all operations of tethered mobile device 200 until additional control messages are received. In some embodiments, disabling operations of tethered mobile device 200 includes but is not limited to disabling communication interfaces 220, disabling access to certain portions of memory 214, and shutting down tethered mobile device 200.

In some embodiments, check-in subsystem 230 provide tracking information to monitoring center 130 regarding activities performed by tethered mobile device 200. Such information includes historical information of the tethered mobile device 200 such as locations visited by tethered mobile device and communications between tethered mobile device 200 and tethered monitoring device 116. In some embodiments, the tracking information is transmitted periodically such as on a predetermined schedule. In other embodiments, the tracking information is transmitted upon a request from monitoring center 130.

In some embodiments, security component 234 implements a security application that maintains security of tethered mobile device 200 to prevent a user from compromising or tampering with tethered monitoring device 116, tethered mobile device 200, and tethered monitoring system 100. Security component 234 implements security protocols such as authentication of users of tethered mobile device 200, authenticating communications between tethered mobile device 200 and tethered monitoring device 116, and restricting user access to any secure areas of tethered mobile device 200. In some embodiments, security component 234 authenticates users utilizing identity data which includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of a user's social security number, mother's maiden name, and the like. Security component 234 is further configured to facilitate a secure communication between tethered mobile device 200 and tethered monitoring device 116 by performing authentication of communications. The authentication includes determining that communications contain expected identifiers identifying the source of communications.

In some embodiments, tracking component 236 implements a tracking application that reports location and positioning information of tethered mobile device 200 to monitoring center 130. In some embodiments, tracking component 236 further includes GPS circuitry to retrieve location information, such as GPS coordinates, of tethered mobile device 200. Tracking component 236 also implements a mapping application that either provides mapping functionality or controls operations of another mapping application installed on tethered mobile device 200. The tracking application and the mapping application coordinate communications to provide navigation (e.g., directions)

information to the user and provide real-time or near-real-time location information to monitoring center 130.

For example, the mapping application receives destination information from the user of tethered mobile device 200 or monitoring center 130. In some embodiments, the user has to submit, for preapproval, destination information to monitoring center 130. If approved, monitoring center 130 transmits the destination information to tracking component 236 which then generates mapping information from the current location of tethered mobile device 200 to the approved destination information. In some embodiments, monitoring center 130 generates and provides the mapping information to tethered mobile device 200 after approving the destination information. In some embodiments, the mapping information is an authorized route between the current location and the approved destination information. The tracking application then tracks the location of tethered mobile device 200 to ensure that it follows the mapping information. For example, the tracking application transmits the location information to monitoring center 130 so that the movements of tethered mobile device 200 can be compared with the generated mapping information. In other embodiments, tracking component 236 verifies that tethered mobile device 200 is following the generated mapping information. Tracking component 236 also communicates with security component 234 to generate alerts and/or notifications to monitoring center 130 and for display on tethered mobile device 200 when tethered mobile device 200 is determined to be moving off of the generated mapping information.

Exemplary Tethered Monitoring Device

Figure 3:
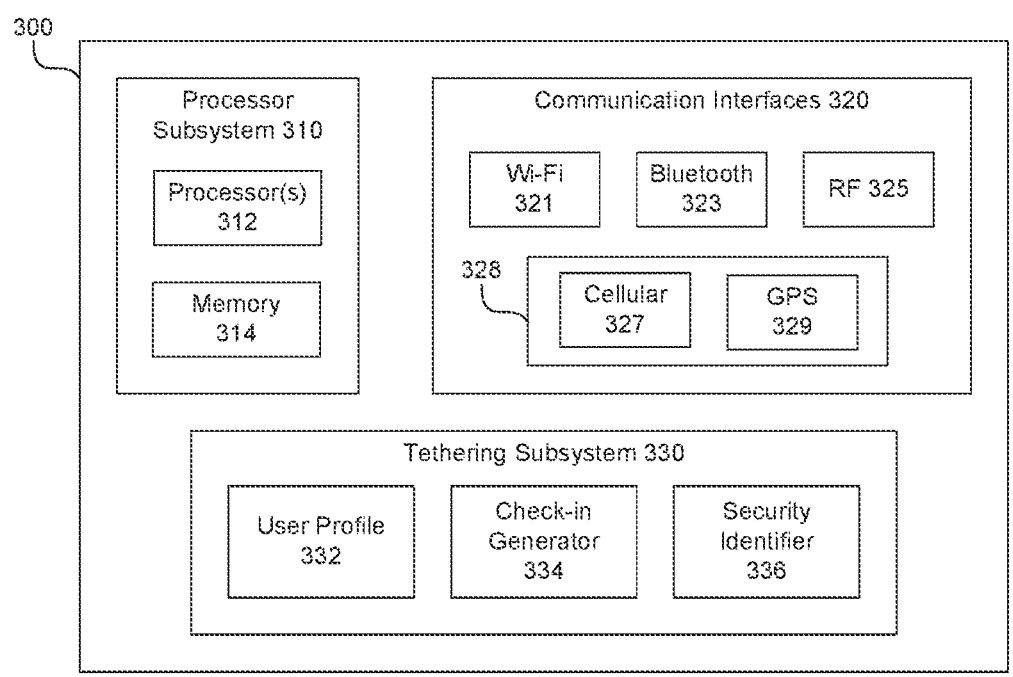
FIG. 3 illustrates an exemplary tethered monitoring device for use in the exemplary tethering monitoring system of FIG. 1, according to embodiments of the present disclosure.

FIG. 3 illustrates a block diagram of tethered monitoring device 300, according to embodiments of the present disclosure. In an embodiment, tethered monitoring device 300 represents an exemplary embodiment of tethered monitoring device 116 of FIG. 1. Tethered monitoring device 300 includes but is not limited to processor subsystem 310, communication interfaces 320, and tethering subsystem 330. Tethered monitoring device 300 communicates with tethered mobile device 200. In some embodiments, tethered monitoring device 300 is semi-permanently attached to a user of tethered mobile device. Semi-permanently means that tethered monitoring device 300 can only be removed under certain conditions such as through a key or a remote signal (e.g., from monitoring center 130). In some embodiments, tethered monitoring device 300 is implemented as an ankle or wrist band.

Processor subsystem 310 includes one or more processors 312 and memory 314. The number of processors can be scaled to match the number of simultaneous user connections desired to be supported by a tethering monitoring system such as tethering monitoring system 100 of FIG. 1. Processor 312 manages operations of tethered monitoring device 300 and memory 314 stores applications for controlling the operations.

Communication interface 320 includes Wi-Fi interface 322, Bluetooth interface 324, and RF interface 326. Communication interface 320 also includes back-up interfaces 328 which includes cellular interface 327 and GPS interface 329. In some embodiments, back-up interfaces 328 are inactive in order to conserve battery usage of tethered monitoring device 300. In some embodiments, monitoring center 130 and/or tethered mobile device 200 will activate cellular interface 327 and/or GPS interface 329 when communications between tethered monitoring device 300 and monitoring center 130 and/or tethered mobile device 200 are interrupted. Activating cellular interface 327 or GPS interface 329 allows tethered monitoring device 300 to be located independently of any communications between monitoring center 130 and/or tethered mobile device 200. In other words, under normal operations, in some embodiments, monitoring center 130 and/or tethered mobile device 200 track the location of tethered monitoring device 300 through any one of Wi-Fi interface 321, Bluetooth interface 323, and RF interface 325.

Tethering subsystem 330 includes user profile 332, check-in generator 334, and security identifier 336. Tethering subsystem 330 is responsible for communicating responses and providing tracking information related to tethered monitoring device 300 to both monitoring center 130 and tethered mobile device 200. User profile 332 stores information related to the user of tethered monitoring device 300 including the user's identification information, security protocols associated with the user, historical information regarding the user's actions related to tethered monitoring device 300.

Check-in generator 334 generates responses to check-in requests received from tethered mobile device 200 and/or monitoring center 130. Check-in requests are either automatic or manual check-in requests. Manual check-in requests include but are not limited to questions that require input from the user (e.g., such as a math problem or question with a response that is likely known only to the user) or specific operations to be performed by the user using tethered mobile device 112. Automatic requests include requests to tethered monitoring device 300 for which check-in generator 334 automatically generates responses. Automatic check-in requests include but are not limited to heartbeat messages, encrypted messages, and requests for responses that include a unique identifier, such as security identifier 336, associated with tethered monitoring device 300. In some embodiments, security identifier 336 is a unique alphanumeric value specific to tethered monitoring device 300.

In some embodiments, tethering subsystem 330 also allows for the download of software and updates from monitoring center 130 and/or tethered mobile device 200 to tethered monitoring device 300. For example, tethering subsystem 330 receives over-the-air wireless updates. In some embodiments, tethering subsystem 330 also performs authentication functions for communications between tethered monitoring device 300 and monitoring center 130 and/or tethered mobile device 200. Authentication functions include encrypting and decrypting communications and information transmitted from and received by tethered monitoring device 300.

Exemplary Tethering Monitoring System Operation

Exemplary usage of tethering monitoring system 100, tethered mobile device 200, and tethered monitoring device 300 will be described with respect to FIGS. 4-7. The exemplary usage described in FIGS. 4-7 can be performed by processing logic that can comprise hardware (e.g., circuitry, dedicated logic, programmable logic, microcode, etc.), software (e.g., instructions executing on a processing device), or a combination thereof. For illustrative purposes, FIGS. 4-7 are described with respect to FIGS. 1-3 but are not limited to these example embodiments. The methods described in FIGS. 4-7 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIGS. 4-7, as will be understood by a person of ordinary skill in the art. Additionally, some steps can be combined with steps of methods from other figures and performed as a single step.

Figure 4:
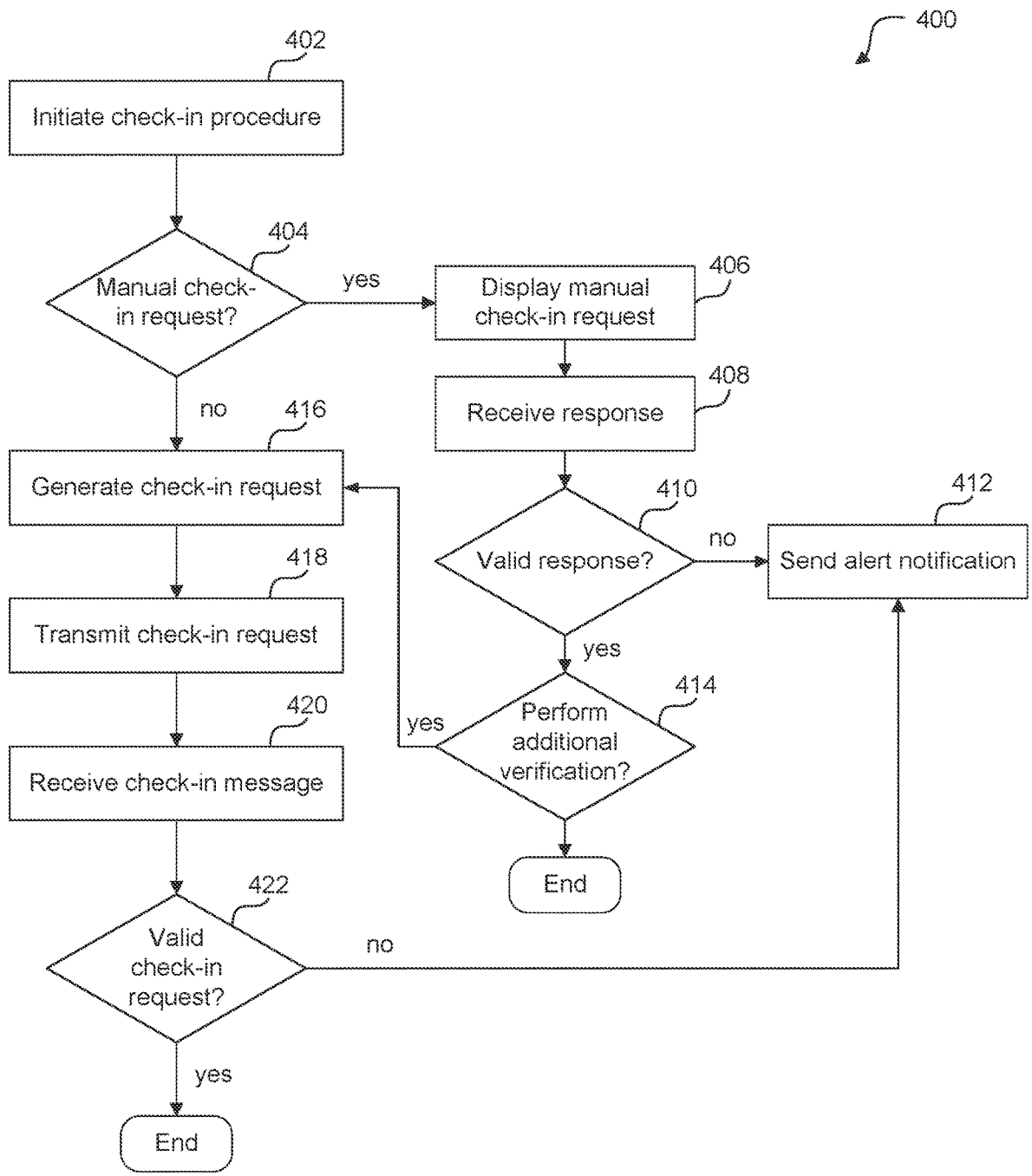
FIG. 4 illustrates a flowchart diagram of an exemplary method for executing a check-in procedure in an exemplary tethered mobile device of FIG. 2, according to embodiments of the present disclosure.

FIG. 4 illustrates a flowchart diagram of an exemplary method for executing a check-in procedure in an exemplary tethered mobile device of FIG. 2, according to embodiments of the present disclosure. In some embodiments, method 400 can be performed by tethered mobile device 200, and in particular, check-in application 239 that is installed in secure area 238 of check-in subsystem 230. For the purposes of discussion below, method 400 is discussed with respect to tethered mobile device 200 but can be performed by other devices as well.

In 402, tethered mobile device 200 initiates a check-in procedure. As described above, the check-in procedure allows tethered mobile device 200 to determine whether a user is within a certain proximity of tethered mobile device 200. The check-in procedure includes requests transmitted from tethered mobile device 200 and responses from either the user or tethered monitoring device 300 that is attached to the user. In some embodiments, monitoring center 130 initiates the requests to be transmitted from tethered mobile device 200.

In 404, tethered mobile device 200 determines whether to initiate a manual or automatic check-in request. Responses to a manual check-in request include user actions or user inputs received from a user through tethered mobile device 200 such as through interacting with a displayed GUI by check-in application 239. Responses to an automatic check-in request include automated responses from tethered monitoring device 300 and do not require user input or action. An action request is a request for the user to perform an action such as utilize the camera of tethered mobile device 200, respond to on-screen prompts, or otherwise utilize tethered mobile device 200 in a manner specified by the GUI.

In 406, tethered mobile device 200 determines that the check-in procedure is transmitting a manual check-in request and displays the manual check-in request such as through a GUI of check-in application 239. As discussed above, the manual check-in request includes requests for a user to provide inputs to questions or to perform actions such as provide a picture of a certain object (e.g., tethered monitoring device 300) or biometric information such as a fingerprint of the user, an image of the user, or a voice sample. In some embodiments, the type of request is random so that the user cannot predict what requests will be displayed to the user. This is to prevent the user from preparing responses so that other users can attempt to respond to the requests. For example, the user may attempt to circumvent the check-in procedure by providing a picture, a voice recording, and other images to another user. Randomizing the requests prevents these attempts. In addition to randomizing the type of request, the content of the request can be randomized as well. For example, the manual check-in request could include a random phrase for the user to repeat (instead of a phrase that repeats for each request), a picture of a random object such as the tethered monitoring device 300, any physical marks on the user (e.g., a tattoo), or an object known to be in the user's room (e.g., a clock).

In 408, tethered mobile device 200 receives a response in the form of a user input or action from the user. In some embodiments, the user interacts with a GUI provided by check-in application 239 in order to provide the user input or action in response to the displayed check-in request. In 410, tethered mobile device 200 validates the response by determining whether the response matches an expected response to the displayed manual check-in request. In other words, it is determined whether the response is a valid or invalid check-in response. For example, a response to a manual check-in request for a user's biometric information would be compared with biometric information associated with the user. In some embodiments, a user's biometric information and/or "correct" responses to check-in requests are stored in secure area 238 of tethered mobile device 200. When a response includes voice samples of the user, check-in application 239 performs voice analysis to determine both that the voice sample is of the user of tethered mobile device 200 and that the voice sample includes the correct word or phrase to be repeated by the user. For example, a manual check-in request could require the user to say the date and time at which the manual check-in request was displayed. Accordingly, check-in application 239 validates a response by determining that the voice sample accurately states the date and time. In other embodiments, a user's biometric information is stored at monitoring center 130 and responses to check-in requests are transmitted from tethered mobile device 200 to monitoring center 130 for comparison and validation.

In 412, if the response is not valid, tethered mobile device 200 sends an alert notification to monitoring center 130. The alert notification informs administrators and jurisdictions that the user could be violating terms of the user's release. Appropriate action such as calling tethered mobile device 200 in an attempt to contact the user, sending authorities to the detected location of tethered mobile device 200 and/or the detected location of tethered monitoring device 300.

In 414, if the response is valid, tethered mobile device 200 determines whether any additional verification is necessary. For example, certain user profiles can indicate that users require more than type of verification based on a user history or by request of a jurisdiction who wishes more careful screening of its users.

In 416, if additional verification is determined to be necessary or if the check-in request is determined to be an automatic check-in request, check-in application 239 generates a check-in request. In 418, tethered mobile device 200 transmits the generated automatic check-in request to tethered monitoring device 300. In some embodiments, the automatic check-in request is a request for tethered monitoring device 300 to respond with a unique device identifier associated with tethered monitoring device 300.

In 420, tethered mobile device 200 receives a response to the automatic check-in request from tethered monitoring device 300. In 422, tethered mobile device 200 determines whether the received response is valid or alternatively determines that no response is received. If the response is not valid or if no response is received at all, tethered mobile device 200 transmits an alert notification to monitoring center 130, in 412.

Figure 5:
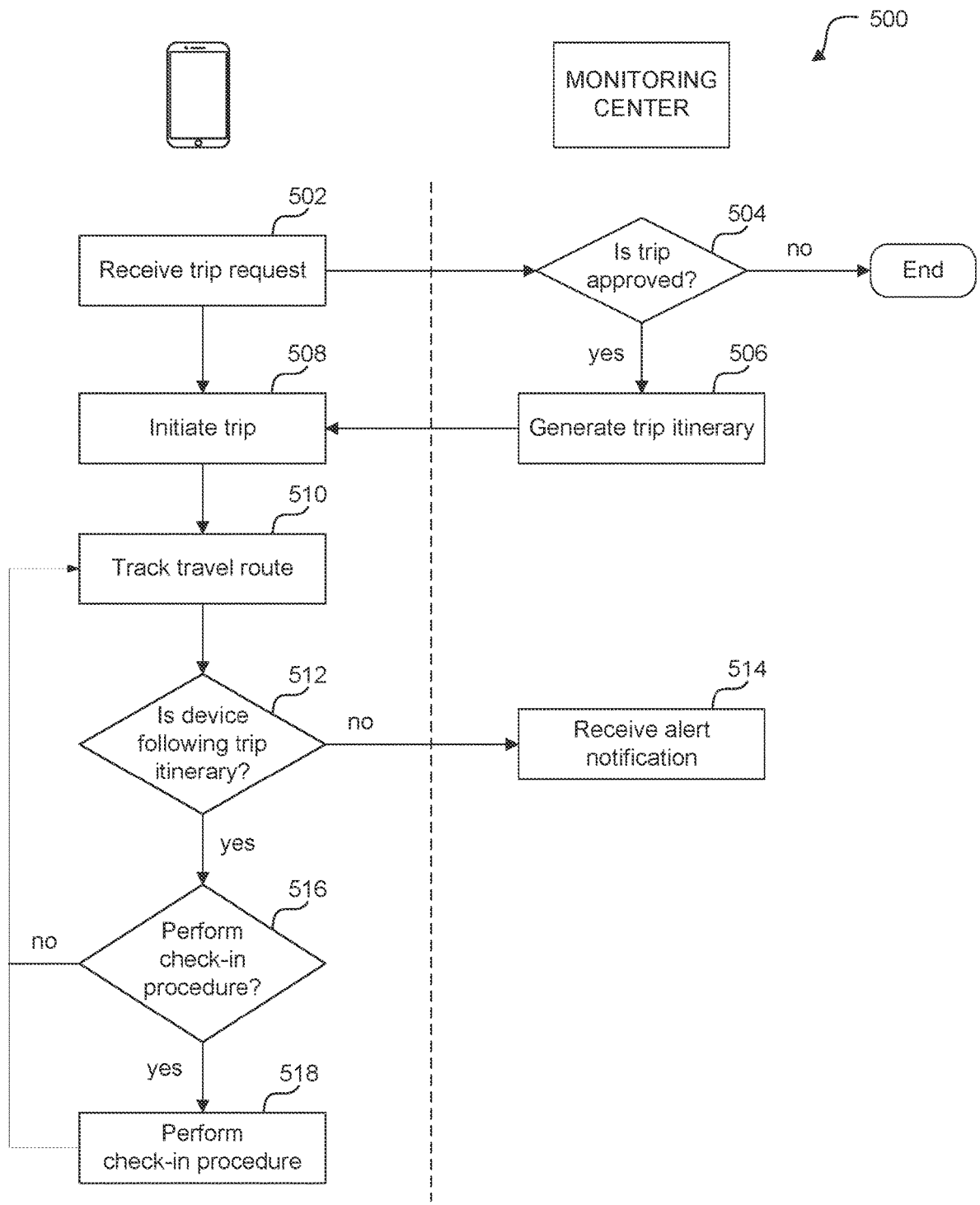
FIG. 5 illustrates a flowchart diagram of an exemplary method for tracking an authorized trip itinerary for the exemplary tethered mobile device of FIG. 2 in the exemplary tethering monitoring system of FIG. 1, according to embodiments of the present disclosure.

FIG. 5 illustrates a flowchart diagram of an exemplary method for tracking an authorized trip itinerary for the exemplary tethered mobile device of FIG. 2 in the exemplary tethering monitoring system of FIG. 1, according to embodiments of the present disclosure. Method 500 can be performed by tethered mobile device 200 and monitoring center 130.

In 502, tethered mobile device 200 receives a trip request from a user that desires to make a trip from his current location or a designated location to which the user is confined. In some embodiments, the user is on house arrest, and the designated location of the user will be the user's house. The trip request includes a destination such as an address. In some embodiments, check-in application 239 displays a route GUI that allows the user to enter trip information such as a current location (if not a designated location) and a destination. Tethered mobile device 200 receives the trip information and determines whether to approve or deny the trip request. There is either automatic or manual approval of the trip request. In some embodiments, tethered mobile device transmits it to monitoring center 130 for approval in 504. With automatic approval, monitoring center 130 and/or tethered mobile device 200 store a list of preapproved destinations to which the user may travel. For example, administrators of the jurisdiction preapprove the destinations which are submitted in advance by the user. For example, the user will provide his doctor's office, a significant other's home, the supermarket to the jurisdiction which can be approved and entered into a list which is stored as part of the user's profile. In some embodiments, the trip information can be approved within check-in application 239 and does not need to be transmitted to be monitoring center 130. For example, check-in application 239 checks the user's profile for a list of approved or restricted locations when determining whether to approve the trip information and generating a trip itinerary to route the user to the destination. With manual approval, the trip information is routed to an authorized administrator for approval.

In 504, if the trip information is transmitted to monitoring center 130, monitoring center 130 determines whether to approve the trip information based on the user profile and any other criteria related to the user. In other embodiments, if the trip information is analyzed at tethered mobile device 200, then tethered mobile device 200 determines whether to approve the trip information. In 506, monitoring center 130 (or tethered mobile device 200) generates the trip itinerary based on the approved trip information. In some embodiments, the trip itinerary is a route for the user to follow from the current location of tethered mobile device 200 to the requested destination. The trip itinerary is provided to tethered mobile device 200.

In 508, tethered mobile device 200 receives the generated trip itinerary and displays it for the user. Check-in application 239 detects that the user has initiated the trip such as by detecting that the user has started along the generated trip itinerary. In 510, check-in application 239 tracks the route taken by tethered mobile device 200. Tracking the position of tethered mobile device 200 includes but is not limited to receiving location information (e.g., GPS coordinates). In 512, check-in application 239 determines whether tethered mobile device 200 is following or deviating from the generated trip itinerary based on the tracked route in 510.

If not, in 514, tethered mobile device 200 transmits an alert notification to alert monitoring center 130 as to the deviation from the generated trip itinerary. In 516, tethered mobile device 200 has determined that it is following the generated trip itinerary and now determines whether to perform an additional check-in procedure to confirm that the user is with the tethered mobile device 200. If not, tethered mobile device 200 continues tracking the travel route in 510. In 518, a check-in procedure is performed similar to what is discussed with respect to FIG. 4.

Figure 6:
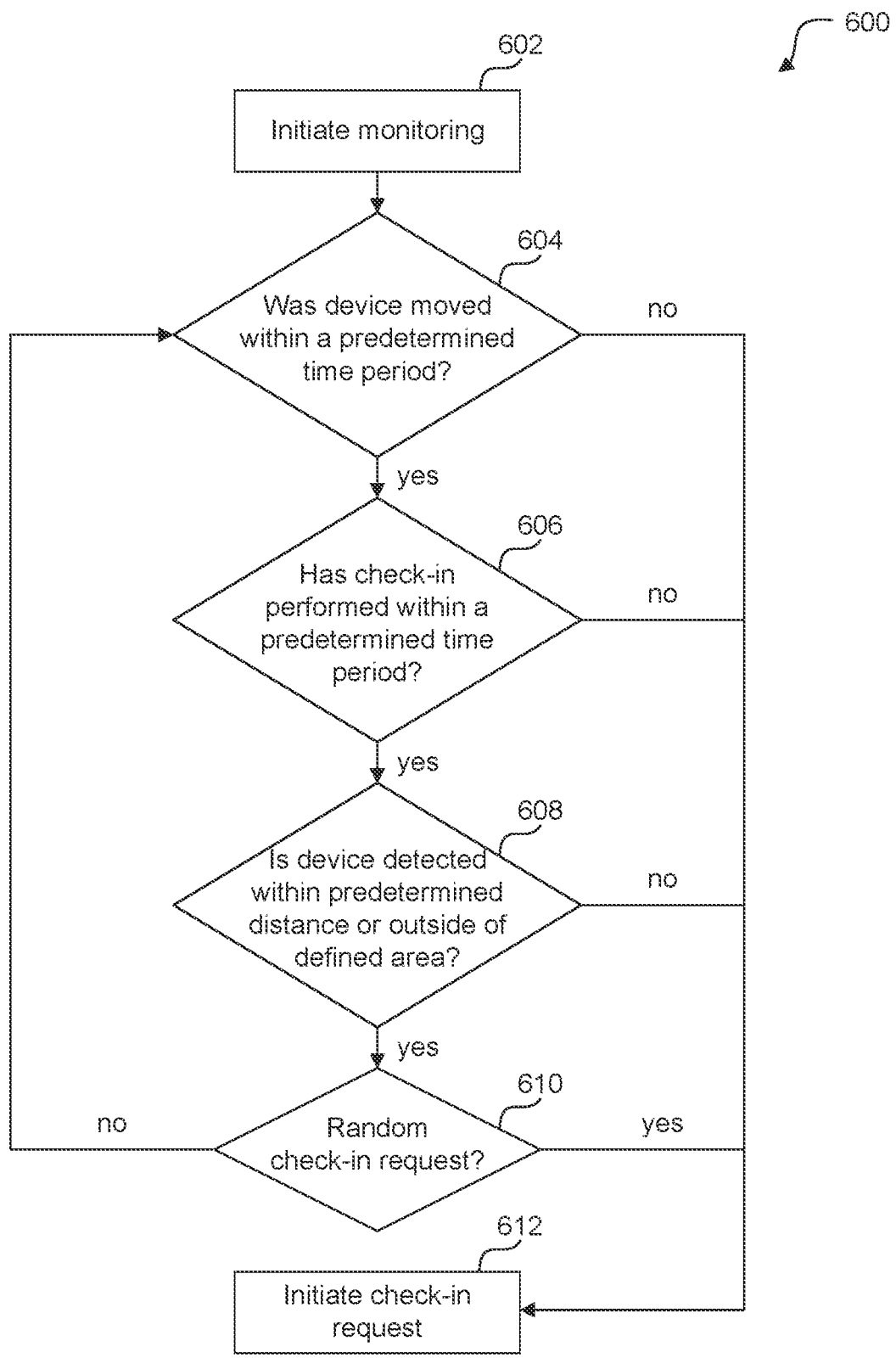
FIG. 6 illustrates a flowchart diagram of an exemplary method for determining when to initiate a check-in procedure in the exemplary tethering monitoring system of FIG. 1, according to embodiments of the present disclosure.

FIG. 6 illustrates a flowchart diagram of an exemplary method for determining when to initiate a check-in procedure in the exemplary tethering monitoring system of FIG. 1, according to embodiments of the present disclosure. In some embodiments, method 600 is performed by tethered mobile device 200 or monitoring center 130.

In 602, tethered mobile device 200 and/or monitoring center 130 initiate a monitoring operation of tethered mobile device 200 to determine whether to initiate the check-in procedure, such as what is described with respect to FIG. 4. In some embodiments, initiating monitoring is performed on an automated basis such as on a predetermined schedule (e.g., every 2 minutes). In some embodiments, initiating monitoring is performed on a manual basis such as manually initiated by an authorized administrator at monitoring center 130. In some embodiments, initiating monitoring is a combination of automated and manual procedures.

In 604-610, certain conditions are checked during the monitoring operation to determine whether to initiate a check-in request. Conditions include but are not limited to a schedule condition and a timeout condition. While certain conditions are discussed in 604-610, other conditions are within the scope of the disclosure. For example, a timeout condition indicates that tethered mobile device 200 has not communicated with monitoring center within a predetermined time period. In 604, it is determined whether tethered mobile device 200 has moved within a predetermined time period from its current location. In some embodiments, monitoring center 130 sets the time period by transmitting a threshold value for storing in tethered mobile device 200. The threshold value represents the predetermined time period. In some embodiments, the time period also involves a specific time of day such as during the daytime or night time hours. For example, it is more likely that tethered mobile device 200 will not be moved while the user is sleeping. However, if tethered mobile device 200 has not moved within a threshold period of time (e.g., 3 hours) during the day, this activity would be more suspicious and could indicate that the user has left tethered mobile device 200 so that the user cannot be tracked.

If tethered mobile device 200 has moved within the predetermined time period, then the monitoring operation moves to 606. In 606, it is determined whether a check-in procedure has been performed within a predetermined time period. This is a schedule condition. In some embodiments, monitoring center 130 sets the value for the time period and transmits the value for storing in tethered mobile device 200. For example, monitoring center 130 can establish that a check-in procedure should be performed on a schedule such as every 15 minutes.

If the check-in procedure has been performed within the predetermined time period, the monitoring operation moves to 608. In 608, it is determined whether tethered mobile device 200 is detected to be outside of a defined area such as the user's home. If tethered mobile device 200 is determined to be outside of the defined area by a predetermined distance, the monitoring operation initiates the check-in procedure. If not, in 610, the monitoring operation determines whether to initiate a random check-in request with tethered mobile device 200. If the conditions of 604-610 do not indicate that the check-in procedure should be performed, then the monitoring operation continues to check the conditions. Otherwise, in 612, tethered mobile device 200 transmits a check-in request and initiates a check-in procedure such as the check-in procedure that is described with respect to FIG. 4.

Figure 7:
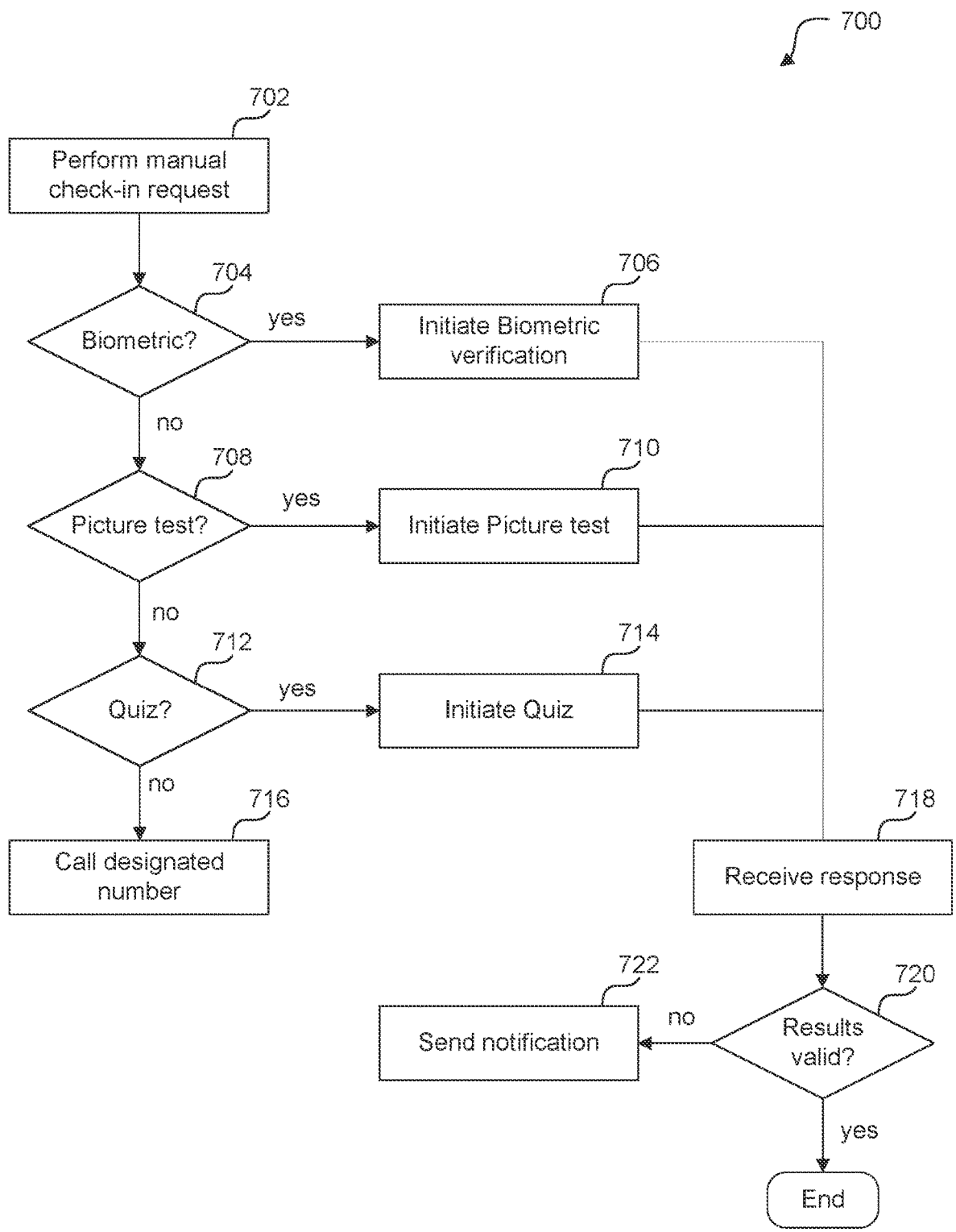
FIG. 7 illustrates a block diagram of an of an exemplary method for performing real-time verification of a monitored person in an exemplary tethered mobile device of FIG. 2 in the exemplary tethering monitoring system of FIG. 1, according to embodiments of the present disclosure.

FIG. 7 illustrates a block diagram of an of an exemplary method for performing a manual check-in request of a monitored person in an exemplary tethered mobile device of FIG. 2 in the exemplary tethering monitoring system of FIG. 1, according to embodiments of the present disclosure. Method 700 can be performed by tethered mobile device 200.

In 702, tethered mobile device 200 determines that a manual check-in request is to be performed. In 704, tethered mobile device 200 determines whether to perform a biometric manual check-in request. Examples of biometric manual check-in requests include but are not limited to fingerprint verification, voice verification, and/or facial recognition. If yes, in 706, tethered mobile device 200 initiates the determined biometric verification. In some embodiments, check-in application 239 provides a GUI with which the user interacts to provide the requested biometric information.

In 708, tethered mobile device 200 determines whether to a picture manual check-in request. Examples of picture manual check-in requests include requesting the user to take a picture of a specific object such as the user's tethered monitoring device 300 or an identifying mark on the user such as a tattoo. If yes, in 710, tethered mobile device 200 initiates the determined picture manual check-in request. In some embodiments, check-in application 239 displays the request on the GUI of tethered mobile device 200.

In 712, tethered mobile device 200 determines whether manual check-in request is a quiz. Examples of quizzes include questions to be answered by the user such as mathematical questions, personal questions related to the user, and identification questions (e.g., requesting the user to identify a displayed image). If yes, in 714, tethered mobile device initiates the quiz. In some embodiments, check-in application 239 provides a GUI with which the user provides a response to the quiz.

In 716, tethered mobile device 200 calls a designated phone number in order to allow the user to manually check-in using a telephone call. For example, the designated phone number is of monitoring center 130 and requires the user to talk with an authorized official at monitoring center 130 in order to check-in.

In 718, if a manual check-in request is performed that results in a response being received from the user. In some embodiments, the response is received by check-in application 239. In some embodiments, the response is transmitted from tethered mobile device 200 to monitoring center 130. In 720, the received response is determined whether to be a valid or invalid check-in response and the received response is validated. In 722 if the response is not valid, tethered mobile device 200 transmits a notification that indicates the response is not valid.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
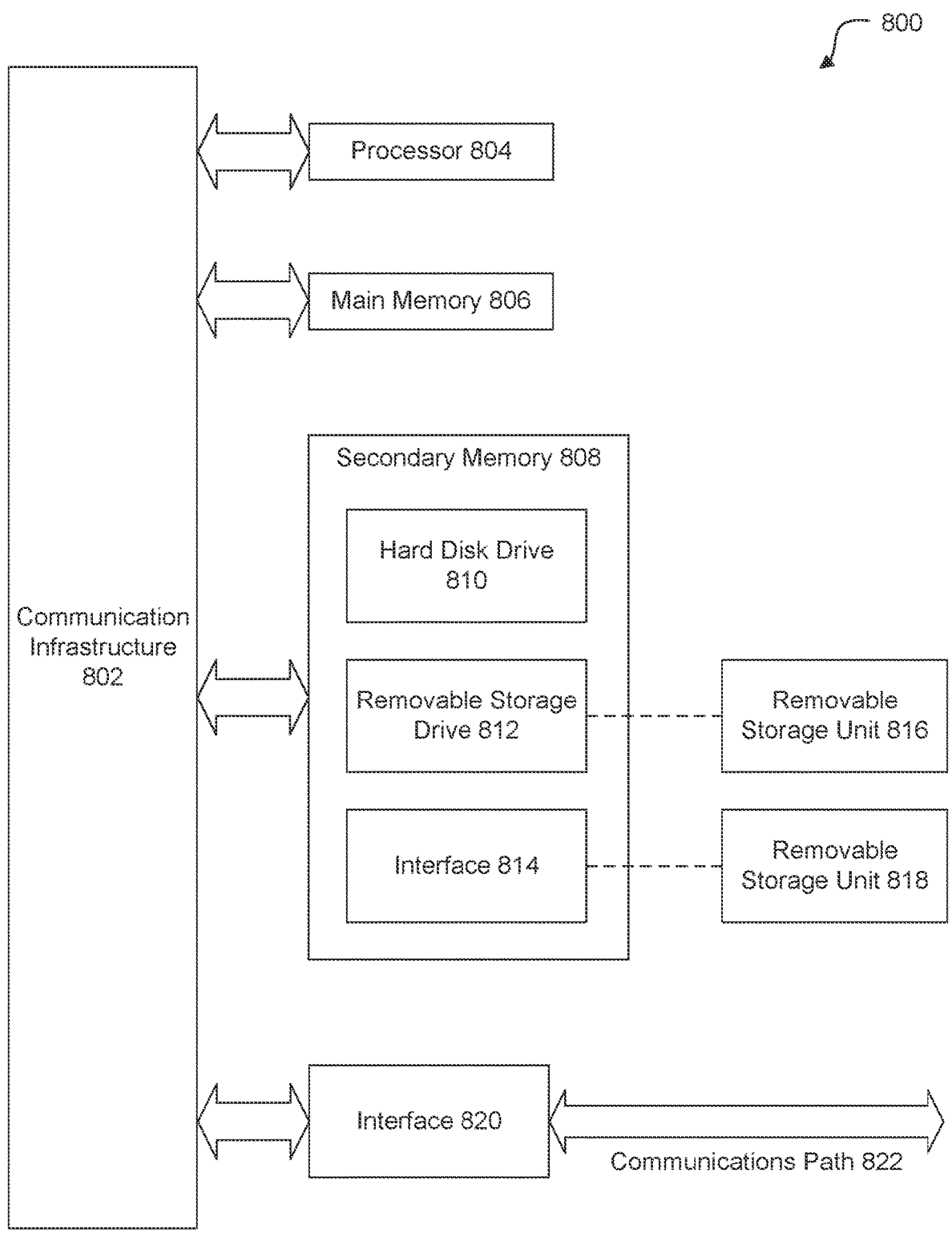
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for providing tethering-based monitoring comprising:
    initiating a monitoring operation on a tethered mobile device for determining whether to initiate a check-in procedure by the tethered mobile device, wherein the monitoring operation includes two or more of:
        determining whether the tethered mobile device has physically moved from a current location within a first predetermined time period;
        determining whether a prior check-in procedure was performed within a second predetermined time period;
        determining whether the tethered mobile device is physically located outside of a defined area; and
        determining whether to perform the check-in procedure on a random basis;
    initiating the check-in procedure responsive to the monitoring operation, wherein the check-in procedure includes a real-time verification request comprising at least one of a biometric real-time verification request, a picture real-time verification request, and a question real-time verification request;
    waiting a predetermined response period for a response to the check-in procedure; and
    transmitting an alert message to a monitoring center when the response to the check-in procedure is not received within the predetermined response period.

2. The method of claim 1, wherein determining whether the tethered mobile device has physically moved from the current location within the first predetermined time period comprises:
    receiving the first predetermined time period from the monitoring center, wherein the first predetermined time period comprises a time of day.

3. The method of claim 1, wherein determining whether the prior check-in procedure was performed within the second predetermined time period comprises:
    receiving the second predetermined time period from the monitoring center, wherein the second predetermined time period is a recurring scheduled time period.

4. The method of claim 1, wherein the biometric real-time verification request comprises at least one of a fingerprint verification, a voice verification, and facial recognition, and wherein the method further comprises:
    displaying, by the tethered mobile device, a graphical user interface for receiving a biometric input to the biometric real-time verification request;
    transmitting the biometric input to the monitoring center; and
    receiving a validation result of the biometric input from the monitoring center.

5. The method of claim 1, wherein the picture real-time verification request comprises a request for the tethered mobile device to receive an image associated with the user, and wherein the method further comprises:
    capturing, by a camera of the tethered mobile device, the image associated with the user;
    transmitting the image to the monitoring center; and
    receiving a validation result of the image from the monitoring center.

6. The method of claim 1, further comprising:
    restricting, by a check-in application installed on the tethered mobile device, operations of the tethered mobile device until the check-in procedure is determined to be completed by the check-in application, wherein the operations include at least one of preventing closing of the check-in application, preventing displaying another application by the tethered mobile device, preventing access to a telephone function of the tethered mobile device, and disabling inputs of the tethered mobile device.

7. A tethered mobile device, comprising:
    a memory; and
    a processor coupled to the memory, the memory configured to store program code that when executed by the processor causes operations to be performed, the operations comprising:
        initiating a monitoring operation on the tethered mobile device for determining whether to initiate a check-in procedure by the tethered mobile device, wherein the monitoring operation includes two or more of:
            determining whether the tethered mobile device has physically moved from a current location within a first predetermined time period;
            determining whether a prior check-in procedure was performed within a second predetermined time period;
            determining whether the tethered mobile device is physically located outside of a defined area; and
            determining whether to perform the check-in procedure on a random basis;
        initiating the check-in procedure responsive to the monitoring operation, wherein the check-in procedure includes a real-time verification request comprising at least one of a biometric real-time verification request, a picture real-time verification request, and a question real-time verification request;

waiting a predetermined response period for a response to the check-in procedure; and transmitting an alert message to a monitoring center when the response to the check-in procedure is not received within the predetermined response period.

8. The tethered mobile device of claim 7, wherein determining whether the tethered mobile device has physically moved from the current location within the first predetermined time period comprises:

receiving the first predetermined time period from the monitoring center, wherein the first predetermined time period comprises a time of day.

9. The tethered mobile device of claim 7, wherein determining whether the prior check-in procedure was performed within the second predetermined time period comprises:

receiving the second predetermined time period from the monitoring center, wherein the second predetermined time period is a recurring scheduled time period.

10. The tethered mobile device of claim 7, wherein the biometric real-time verification request comprises at least one of a fingerprint verification, a voice verification, and facial recognition, and wherein the operations further comprise:

displaying, by the tethered mobile device, a graphical user interface for receiving a biometric input to the biometric real-time verification request;

transmitting the biometric input to the monitoring center; and receiving a validation result of the biometric input from the monitoring center.

11. The tethered mobile device of claim 7, wherein the picture real-time verification request comprises a request for the tethered mobile device to receive an image associated with the user, and wherein the operations further comprise:

capturing, by a camera of the tethered mobile device, the image associated with the user;

transmitting the image to the monitoring center; and receiving a validation result of the image from the monitoring center.

12. The tethered mobile device of claim 7, the operations further comprising:

restricting, by a check-in application installed on the tethered mobile device, functions of the tethered mobile device until the check-in procedure is determined to be completed by the check-in application, wherein the functions include at least one of preventing closing of the check-in application, preventing displaying another application by the tethered mobile device, preventing access to a telephone function of the tethered mobile device, and disabling inputs of the tethered mobile device.

13. A non-transitory computer-readable medium having instructions stored therein, which when executed by a processor in a tethered mobile device, cause the processor to perform operations, the operations comprising:

initiating a monitoring operation on a tethered mobile device for determining whether to initiate a check-in procedure by the tethered mobile device, wherein the monitoring operation includes two or more of:

determining whether the tethered mobile device has physically moved from a current location within a first predetermined time period;

determining whether a prior check-in procedure was performed within a second predetermined time period;

determining whether the tethered mobile device is physically located outside of a defined area; and determining whether to perform the check-in procedure on a random basis;

Initiating the check-in procedure responsive to the monitoring operation, wherein the check-in procedure includes a real-time verification request comprising at least one of a biometric real-time verification request, a picture real-time verification request, and a question real-time verification request;

waiting a predetermined response period for a response to the check-in procedure; and transmitting an alert message to a monitoring center when the response to the check-in procedure is not received within the predetermined response period.

14. The non-transitory computer readable medium of claim 13, wherein determining whether the tethered mobile device has physically moved from the current location within the first predetermined time period comprises:

receiving the first predetermined time period from the monitoring center, wherein the first predetermined time period comprises a time of day.

15. The non-transitory computer readable medium of claim 13, wherein determining whether the prior check-in procedure was performed within the second predetermined time period comprises:

receiving the second predetermined time period from the monitoring center, wherein the second predetermined time period is a recurring scheduled time period.

16. The non-transitory computer readable medium of claim 13, wherein the biometric real-time verification request comprises at least one of a fingerprint verification, a voice verification, and facial recognition, and wherein the operations further comprise:

displaying, by the tethered mobile device, a graphical user interface for receiving a biometric input to the biometric real-time verification request;

transmitting the biometric input to the monitoring center; and receiving a validation result of the biometric input from the monitoring center.

17. The non-transitory computer readable medium of claim 13, wherein the picture real-time verification request comprises a request for the tethered mobile device to receive an image associated with the user, and wherein the operations further comprise:

capturing, by a camera of the tethered mobile device, the image associated with the user;

transmitting the image to the monitoring center; and receiving a validation result of the image from the monitoring center.

* * * * *

UNITED STATES PATENT AND TRADEMARK OFFICE
CERTIFICATE OF CORRECTION

PATENT NO. : 12,051,295 B2
APPLICATION NO. : 18/196461
DATED : July 30, 2024
INVENTOR(S) : Hodge It is certified that error appears in the above-identified patent and that said Letters Patent is hereby corrected as shown below:

In the Claims

In Column 22, Claim 14, Line 22, delete "computer readable" and insert -- computer-readable --, therefor.

In Column 22, Claim 15, Line 29, delete "computer readable" and insert -- computer-readable --, therefor.

In Column 22, Claim 16, Line 36, delete "computer readable" and insert -- computer-readable --, therefor.

In Column 22, Claim 17, Line 48, delete "computer readable" and insert -- computer-readable --, therefor.

Signed and Sealed this
Nineteenth Day of November, 2024

Katherine Kelly Vidal
*Director of the United States Patent and Trademark Office*